US010836439B2

(12) United States Patent
Roux et al.

(10) Patent No.: US 10,836,439 B2
(45) Date of Patent: Nov. 17, 2020

(54) FIXATION LEG FOR A VEHICLE INTERIOR PANEL AND METHOD OF MANUFACTURING SAME

(71) Applicant: Faurecia Interior Systems, Inc., Auburn Hills, MI (US)

(72) Inventors: Jerome Roux, Simpsonville, SC (US); Roberto Ortiz, Cholula Puebla (MX); Peter Vitale, Windsor (CA)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 90 days.

(21) Appl. No.: 15/991,455

(22) Filed: May 29, 2018

(65) Prior Publication Data
US 2019/0367097 A1 Dec. 5, 2019

(51) Int. Cl.
| | | |
|---|---|---|
| *B62D 25/14* | (2006.01) | |
| *B23K 26/38* | (2014.01) | |
| *B60J 5/04* | (2006.01) | |
| *B60R 21/055* | (2006.01) | |
| *B60R 21/045* | (2006.01) | |
| *B23K 101/00* | (2006.01) | |

(52) U.S. Cl.
CPC ............ *B62D 25/145* (2013.01); *B23K 26/38* (2013.01); *B60J 5/0461* (2013.01); *B60R 21/045* (2013.01); *B60R 21/055* (2013.01); *B23K 2101/006* (2018.08)

(58) Field of Classification Search
CPC .... B60J 5/0461; B62D 25/145; B60R 21/055; B60R 21/045

USPC ...................................................... 296/187.05
See application file for complete search history.

(56) References Cited

U.S. PATENT DOCUMENTS

| | | | | |
|---|---|---|---|---|
| 8,764,087 | B2 * | 7/2014 | Specht ................... | B60N 3/026 296/1.02 |
| 10,363,878 | B1 * | 7/2019 | Lee .......................... | B60R 7/08 |
| 2001/0037998 | A1 * | 11/2001 | Nicholas .............. | B23K 26/032 219/121.69 |
| 2002/0195833 | A1 * | 12/2002 | Fukutomi .............. | B60J 5/0425 296/146.6 |
| 2003/0107242 | A1 * | 6/2003 | Fox ......................... | B60R 21/04 296/187.05 |
| 2003/0173763 | A1 * | 9/2003 | Yamazaki ............. | B60R 21/045 280/748 |
| 2004/0124623 | A1 * | 7/2004 | Yamazaki ............. | B60R 21/045 280/752 |
| 2009/0134659 | A1 * | 5/2009 | Hall ....................... | B60J 5/0434 296/146.7 |
| 2009/0134660 | A1 * | 5/2009 | Pinkerton ............ | B60N 2/4235 296/146.7 |
| 2009/0146405 | A1 * | 6/2009 | Kawashima .......... | B60R 21/045 280/751 |

(Continued)

*Primary Examiner* — Jason S Morrow
(74) *Attorney, Agent, or Firm* — Reising Ethington P.C.

(57) ABSTRACT

A fixation leg for a vehicle interior panel includes an impact energy absorption region having one or more partial or complete perforations. Each one of the perforations may be formed by laser ablating material from the fixation leg at the impact energy absorption region. The impact energy absorption region is weakened due to the partial or complete perforations such that upon impact with the vehicle interior panel, the fixation leg can break and absorb some of the impact energy. In one embodiment, the fixation leg attaches a substrate of a vehicle instrument panel to a structural crossmember.

18 Claims, 3 Drawing Sheets

(56) References Cited

U.S. PATENT DOCUMENTS

2011/0227369 A1* 9/2011 Abe .................. B62D 21/15
296/193.02

* cited by examiner

FIXATION LEG FOR A VEHICLE INTERIOR PANEL AND METHOD OF MANUFACTURING SAME

TECHNICAL FIELD

The invention relates generally to vehicle interior panels and is particularly pertinent to fixation legs that attach interior panels to vehicle structural components.

BACKGROUND

Fixation legs are used to attach the substrate of a vehicle interior panel to the underlying structure or frame of the vehicle. Weakening the fixation legs can assist with energy absorption when force is applied to the vehicle interior panel. For example, it can be desirable to break the fixation leg that attaches the vehicle instrument panel substrate to the underlying crossmember when the instrument panel is impacted during a vehicle collision.

SUMMARY

In accordance with various embodiments, there is provided a fixation leg for an interior panel of a vehicle. The fixation leg comprises a body extending between a substrate attachment end configured to be attached to, or integral with, a substrate of the interior panel and a structural attachment end configured to be attached to, or integral with, a structural component of the vehicle. The fixation leg further comprises an impact energy absorption region located in the body between the substrate attachment end and the structural attachment end, wherein the impact energy absorption region includes one or more partial or complete perforations.

In some embodiments, the fixation leg comprises a first lateral edge and a second lateral edge between the substrate attachment end and the structural attachment end on either side of the body.

In some embodiments, a concentration of a plurality of partial or complete perforations is higher toward a midline of the body than toward each of the first and second lateral edges.

In some embodiments, a plurality of partial or complete perforations extend in a line from the first lateral edge to the second lateral edge.

In some embodiments, a plurality of partial or complete perforations include all complete perforations.

In some embodiments, a plurality of partial or complete perforations include all partial perforations.

In some embodiments, at least some partial perforations have a variable depth.

In some embodiments, a plurality of partial or complete perforations include a combination of partial and complete perforations.

In some embodiments, the body includes a bend that delineates a structural attachment portion at the structural attachment end and an angled transition portion between the structural attachment portion and the substrate attachment end.

In some embodiments, the impact energy absorption region is located in the angled transition portion.

In some embodiments, the impact energy absorption region is aligned with a convex curved portion of the bend.

In some embodiments, the fixation leg comprises a second bend that delineates a substrate attachment portion at the substrate attachment end such that the angled transition portion is located between the first and second bends and between the substrate attachment end and the structural attachment end.

In some embodiments, the impact energy absorption region is aligned with a convex curved portion of the second bend.

In some embodiments, both bends include an impact energy absorption region.

In some embodiments, the structural component of the vehicle is a crossmember and the interior panel is an instrument panel.

In accordance with various embodiments, there is provided a method of manufacturing a fixation leg for an interior panel of a vehicle. The method includes directing a laser beam at a body of the fixation leg and removing material from the body with the laser beam to form one or more partial or complete perforations at an impact energy absorption region.

In some embodiments, the method includes the step of injection molding the body of the fixation leg before the step of directing the laser beam, wherein the injection molded body has a consistent thickness.

In some embodiments, the injection molding step includes integrally molding the body of the fixation leg with a substrate of the interior panel of the vehicle.

In some embodiments, the material is removed at each of the partial or complete perforations by a discrete laser pulse.

In some embodiments, the material is removed in a plurality of sequential ablation passes.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a vehicle interior panel including a weakened fixation leg to attach the vehicle interior panel to an underlying structural member. The weakened fixation leg can absorb energy when the vehicle interior panel is impacted. For example, an impact energy absorption region includes one or more partial or complete perforations to selectively weaken the fixation leg and encourage an energy absorbing breakage upon impact. Impact energy absorption regions may be located in specific areas in the fixation leg to help optimize or selectively locate breakage. Each of the perforations may be formed by laser ablating material from the fixation leg at the impact energy absorption regions. The fixation legs and manufacturing methods described herein may be particularly useful with a fixation leg that attaches a vehicle instrument panel to an underlying crossmember, as weakening this fixation leg in particular may absorb energy when a pedestrian is struck and breaks the windshield.

Figure 1:
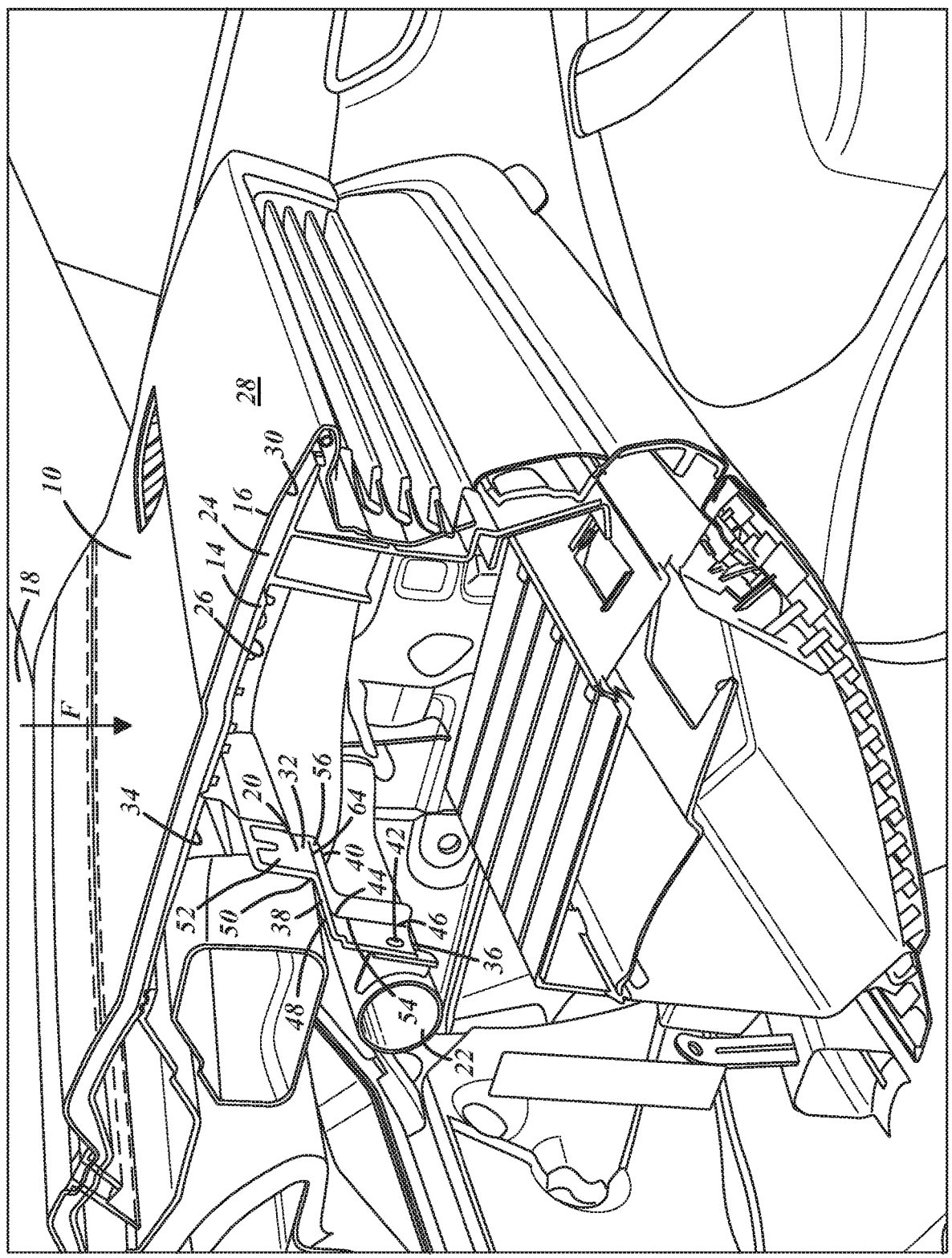
FIG. 1 is a partial, cross-sectional view of an embodiment of a vehicle interior panel including a fixation leg that attaches a substrate of the panel to an underlying crossmember.

FIG. 1 is a perspective view of an embodiment of an interior panel 10 for a vehicle 12. The panel 10 includes a substrate 14 and a skin layer 16 disposed over the substrate. In the illustrated embodiments, the panel 10 is an instrument panel located adjacent the windshield 18. A fixation leg 20 attaches the substrate 14 of the instrument panel 10 to crossmember 22. While the disclosed embodiments of the fixation leg 20 may be advantageously or preferably used with an instrument panel, other examples of vehicle interior panels include interior door panels, steering wheel panels, seat panels, pillar panels, and roof panels, to name a few.

The substrate 14 may be semi-rigid and can generally define the overall shape and structure of the panel 10. An example of a suitable semi-rigid construction is injection molded glass-reinforced polypropylene having a wall thickness in a range from 2.0 mm to 4.0 mm. Other materials and combinations of materials exhibiting similar shape-maintaining characteristics may be used. The substrate 14 is described as semi-rigid to distinguish from perfectly rigid (i.e., entirely inflexible), but should be sufficiently rigid to support its own weight and the weight of the skin layer 16, along with any other attached components, without noticeable sagging or bending. The substrate includes an inboard side 24 and an outboard side 26. The terms "inboard" and "outboard" are generally used to orient various vehicle components closer toward the interior passenger cabin (i.e., "inboard") or facing away from the interior passenger cabin (i.e., "outboard"). The inboard side 24 of the substrate 14 directly or indirectly interfaces with the skin layer 16, and the outboard side 26 of the substrate 14 directly or indirectly interfaces with various structural components of the vehicle 12 such as the crossmember 22 via the fixation leg 20. The fixation leg 20 is attached to (e.g., mechanically via a screw or the like or integrally molded with, to cite two examples) the outboard side 26 of the substrate 14. Other arrangements or configurations for the substrate 14 are certainly possible.

The skin layer 16 is a primarily aesthetic component that provides a desired appearance, texture, and tactile feel to the panel 10 and may itself include multiple layers. The skin layer 16 has an inboard side 28 that faces an interior of a passenger cabin of the vehicle in which the panel 10 is installed, as well as an opposite outboard side 30 that faces the substrate 14 in the assembled panel. Various foam or interlayers may be disposed between the outboard side 30 of the skin layer 16 and the inboard side 14 of the substrate 14.

Figure 2:
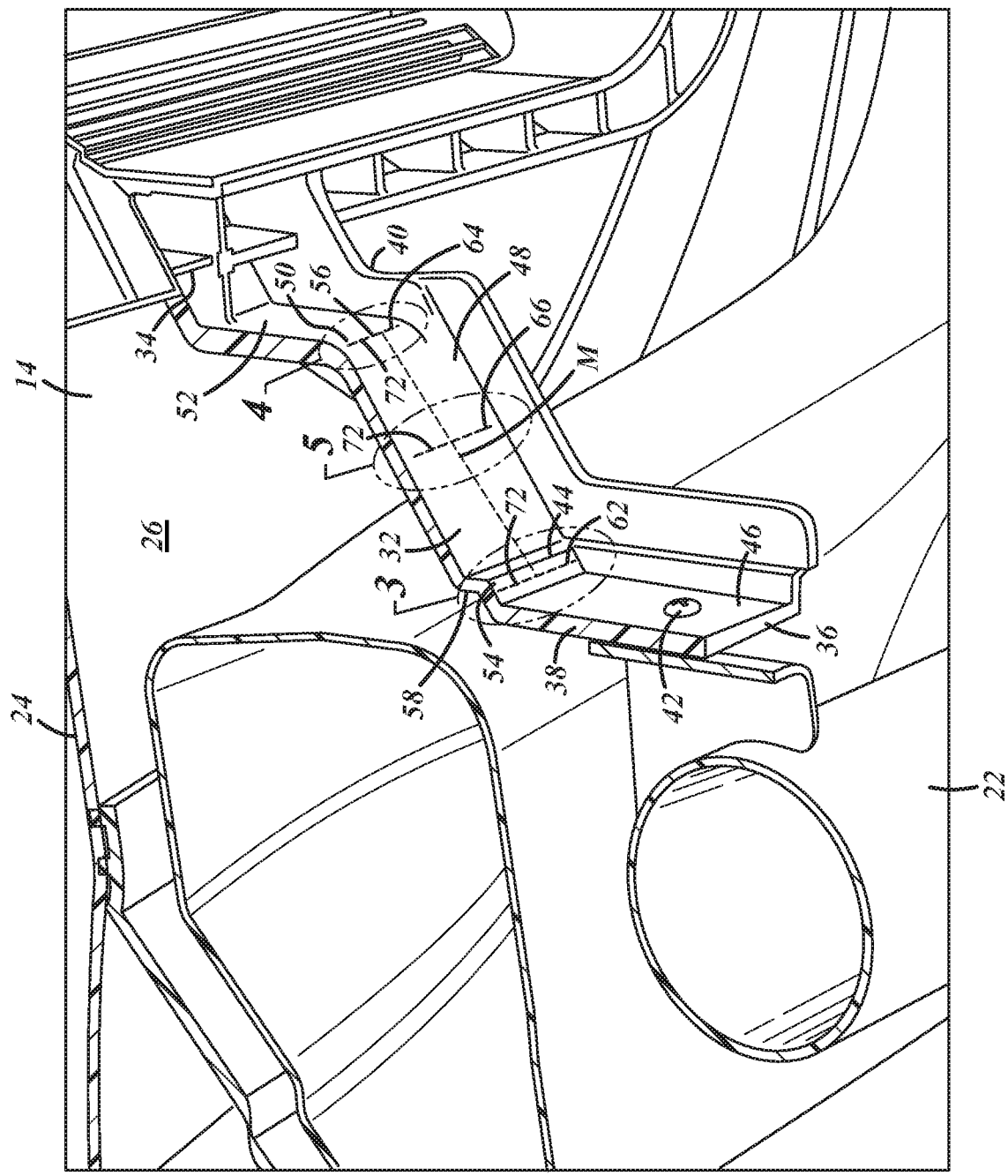
FIG. 2 is an enlarged view of the fixation leg of FIG. 1.

The substrate 14 of the panel 10 is attached to the crossmember 22 via the fixation leg 20. FIG. 2 is an enlarged view of the fixation leg 20 and the crossmember 22. The fixation leg 20 includes a body 32 that extends between a substrate attachment end 34 and a structural attachment end 36. First and second lateral edges 38, 40 span either side of the body 32 between the substrate attachment end 34 and the structural attachment end 36. The substrate attachment end 34 is configured to be attached to, or integral with, the substrate 14 of the panel 10. In the illustrated embodiment, the substrate attachment end 34 is integrally molded with the substrate 14. Accordingly, in some embodiments, the fixation leg 20 comprises the same injection molded glass-reinforced polypropylene as the substrate 14. The structural attachment end 36 is configured to be attached to, or integral with, a structural component of the vehicle 12 such as the crossmember 22. In the illustrated embodiment, the structural attachment end 36 is mechanically attached to the crossmember 22 via a terminal screw 42. The structural component attached to the fixation leg 20 may be any structural beam, bar, rail, pillar, column, frame, etc., that acts as a structural, loadbearing support of the vehicle 12. In some embodiments, the structural component attached to the fixation leg 20 is a component that is directly linked to the body in white. The main instrument panel 10 crossmember 22 is directly linked to the body in white during manufacture of the vehicle 12.

In some embodiments, such as the illustrated embodiment, the body 32 of the fixation leg 20 includes a bend 44 that delineates a structural attachment portion 46 at the structural attachment end 34 and an angled transition portion 48 between the structural attachment portion 46 and the substrate attachment end 34. The body 32 may also include a second bend 50 that delineates a substrate attachment portion 52 at the substrate attachment end 34 such that the angled transition portion 48 is located between the first and second bends 44, 50 and between the substrate attachment end 23 and the structural attachment end 36. Each bend 44, 50 includes a respective convex curve portion 54, 56 and a corresponding concave curve portion 58, 60 on the other side of the body 32. Either of the bends 44, 50 may be molded, stamped, or otherwise formed in the body 32 of the fixation leg 20. Moreover, other configurations, arrangements, fixation means, etc. may be used, depending on the desired implementation.

The fixation leg 20 includes one or more impact energy absorption regions 62, 64, 66. In some embodiments, the fixation leg 20 advantageously only includes one impact energy absorption region 62 to encourage breakage at only one location, although it is possible to have more or less impact energy absorption regions than what is depicted in the illustrated embodiment. The impact energy absorption regions 62, 64, 66 form weakened areas in the body 32 of the fixation leg 20 that are configured to more easily break upon a certain level of applied force F (see FIG. 1). Accordingly, the impact energy absorption regions 62, 64, 66 are located at predetermined breakage points designed to selectively locate breakage and optimize energy absorption from a potential impact. The desired amount of weakening should account for handling of the instrument panel 10 during manufacture, as well as supporting the attachment of the substrate 14 to the crossmember 22, and balancing those needs with an ability to break or bend at a certain impact force.

With reference to FIGS. 2-5, the impact energy absorption regions 62, 64, 66 comprise one or more partial perforations 68 or complete perforations 70. In the illustrated embodiments, the plurality of partial or complete perforations 68, 70 extend in a straight line 72 from the first lateral edge 38 to the second lateral edge 40. While the line 72 is advantageous because it can more selectively promote breakage, other shapes for the impact energy absorption regions 62, 64, 66 are possible. For example, the impact energy absorption region may form a wider area between the substrate attachment end 34 and the structural attachment end 36 than what is illustrated. In another example, only a single, elongated perforation is used at the impact energy absorption region.

Figure 3:
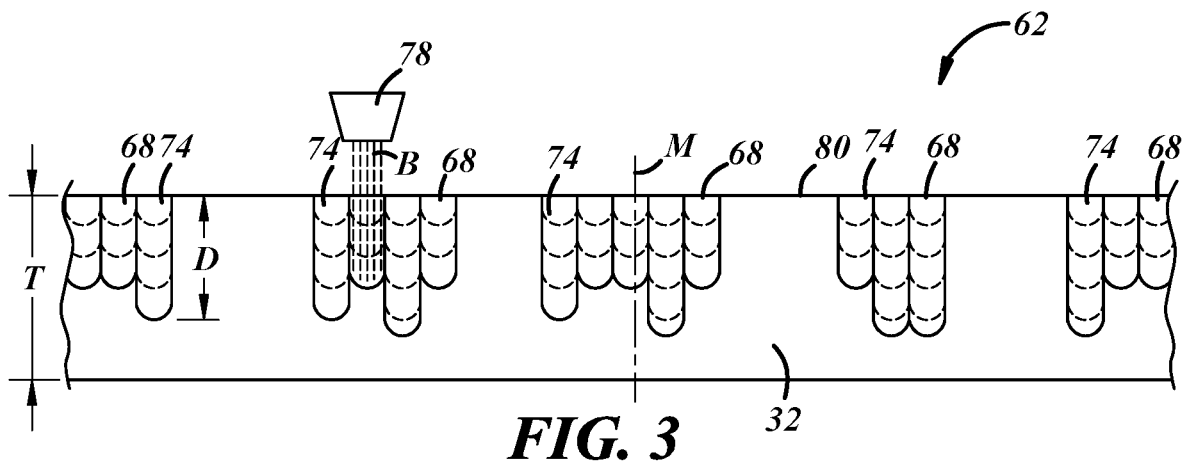
FIG. 3 is a partial cross-sectional view of one embodiment of an impact energy absorption region of the fixation leg of FIGS. 1 and 2.
Figure 4:
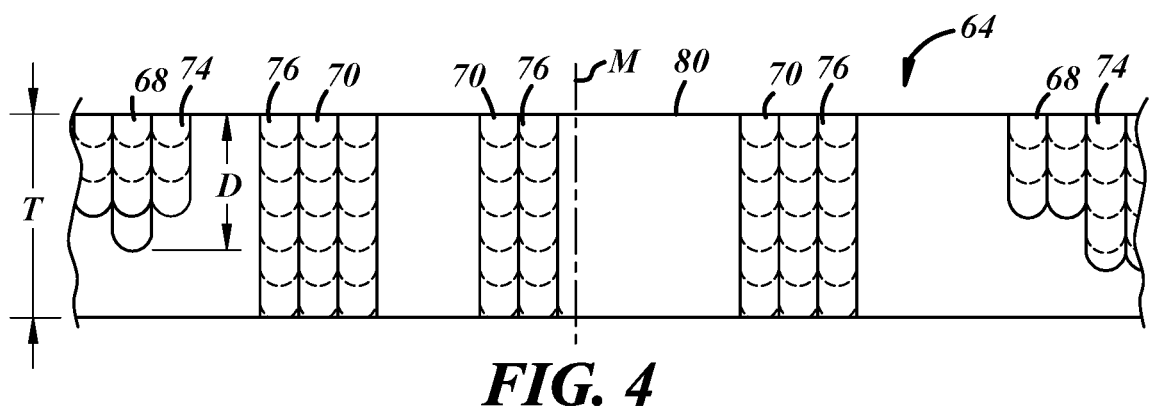
FIG. 4 is a partial cross-sectional view of one embodiment of an impact energy absorption region of the fixation leg of FIGS. 1 and 2.
Figure 5:
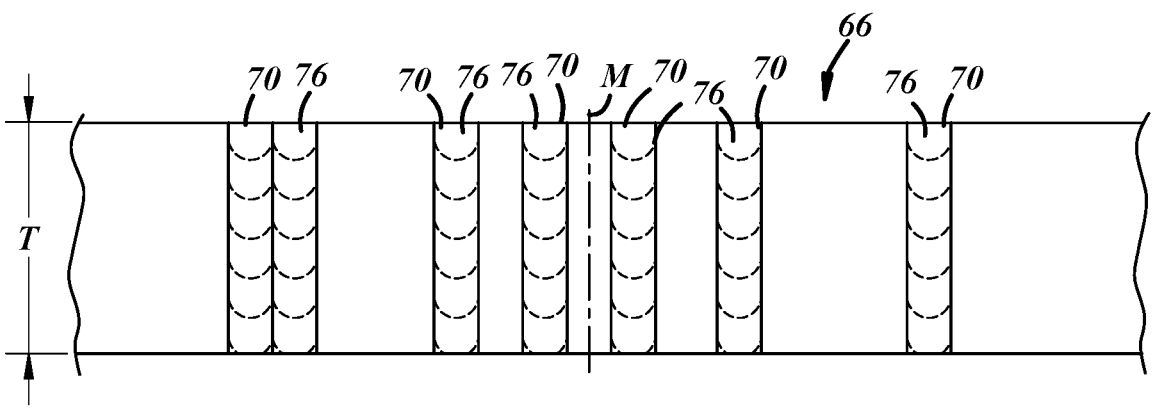
FIG. 5 is a partial cross-sectional view of one embodiment of an impact energy absorption region of the fixation leg of FIGS. 1 and 2.

FIGS. 3-5 are partial, cross-sectional views of the respective impact energy absorption regions 62, 64, 66. These example embodiments are meant to show possible variations for configurations of impact absorption regions, and as addressed above, in one advantageous embodiment, there is only one impact energy absorption region located at the first bend 44, which may include only complete perforations 70, as the complete perforations 70 may better promote breakage and may be easier to manufacture than partial perforations 68. The partial perforations 68 include blind cuts 74, and the complete perforations 70 include through cuts 76. Each blind cut 74 and through cut 76 represent a continuous void volume within the thickness T of the body 32 of the fixation leg 20. The partial perforations 68 may have a non-uniform depth D, which may at least partly be a result of laser ablation of material at a plurality of locations within the same perforation 68, giving the end of each blind cut 74 a scalloped configuration or shape as shown in FIGS. 3 and 4. In some embodiments, including additional blind cuts 74 for each partial perforation 68 or additional through cuts 76 for each complete perforation 78 may result in an elongated or oblong perforation shape. In other embodiments, the perforation 68, 70 may have a generally circular shape (such as with FIG. 5 where all complete perforations 70 correspond to a single through cut 76).

The relative spacing between perforations 68, 70 may be uniform, or it may vary along the length of line 72. The length of line 72 may correspond with the width of the fixation leg 20, which is about 2 mm to 4 mm, with about 2.5 mm being preferred. In some embodiments, a concentration of perforations 68, 70 may be greater towards a midline M of the body 32 between the first and second lateral edges 38, 40. This arrangement is illustrated, for example, in FIG. 5. In other embodiments, the type or structure of the perforations 68, 70 may vary. For example, the depth D of partial perforations 68 may be greater at perforations toward the midline M. In the embodiment illustrated in FIG. 4, there may be more complete perforations 70 toward the midline M, with more partial perforations 68 located away from the midline M or closer to each lateral edge 38, 40. In some embodiments, it is advantageous to locate the impact energy absorption region at one or more bends 44, 50. More particularly, it may be advantageous to locate perforations 68, 70 at a convex curve portion 54, 56 of a bend 44, 50. These arrangements may result in the perforations 68, 70 acting as greater stress concentrators to promote breakage.

With reference to FIG. 3, a laser beam B from a laser source 78 may be used to manufacture a fixation leg 20 with an impact absorption region 62, 64, 66. As described above, the fixation leg 20 may be injection molded (in some embodiments integrally with the substrate 14), and advantageously, the fixation leg 20 is molded or otherwise formed with a generally consistent or uniform thickness T. The thickness T in one embodiment is about 0.5 mm to 1 mm, with about 0.7 mm being preferred. Forming the fixation leg 20 with a generally consistent or uniform thickness T may help to avoid possible filling problems with an injection mold process, and may result in more accurate or uniform mold filling. After molding the body 32 of the fixation leg 20, the manufacturing method may include directing a laser beam B from the laser source 78. The laser system is configured to controllably aim the laser beam B at any of the plurality of locations associated with each perforation 68, 70 to be formed at a cut side 80 of the body 32. In some embodiments, the cut side 80 may be the opposite side from what is illustrated in the figures. Aiming the laser beam may be accomplished with a programmable motion controller in one example. In the illustrated embodiment, the laser beam B impinges the cut side 80 of the body 32 with a zero angle of incidence (i.e., perpendicular to the cut side 80). Impingement of the cut side 80 with the laser beam B removes material from the body 32 to form the plurality of partial or complete perforations 68, 70 at the impact energy absorption regions 62, 64, 66. In some embodiments, the laser beam B arrives at the body 32 in ultra-short and discrete laser pulses. Further, sequential laser passes may be used to remove the material. Each sequential laser pass is generally represented by the scalloped shape dotted lines in each perforation 68, 70 depicted in FIGS. 3-5. There are multitudes of variables in the material removal process and in the resulting fixation leg and impact energy absorption region. Accordingly, the process parameters may be adjusted depending on various factors such as the materials being used, the laser ablating process, etc.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A fixation leg for an interior panel of a vehicle comprising:
   a body extending between a substrate attachment end configured to be attached to, or integral with, a substrate of the interior panel and a structural attachment end configured to be attached to, or integral with, a structural component of the vehicle; and
   an impact energy absorption region located in the body between the substrate attachment end and the structural attachment end, wherein the impact energy absorption region includes a plurality of partial perforations or a combination of partial and complete perforations.

2. The fixation leg of claim 1, further comprising a first lateral edge and a second lateral edge between the substrate attachment end and the structural attachment end on either side of the body.

3. A fixation leg for an interior panel of a vehicle comprising:
   a body extending between a substrate attachment end configured to be attached to, or integral with, a substrate of the interior panel and a structural attachment end configured to be attached to, or integral with, a structural component of the vehicle, the body having a first lateral edge and a second lateral edge between the substrate attachment end and the structural attachment end on either side of the body; and an impact energy absorption region located in the body between the substrate attachment end and the structural attachment end, wherein the impact energy absorption region includes one or more partial or complete perforations, wherein a concentration of a plurality of partial or complete perforations is higher toward a midline of the body than toward each of the first and second lateral edges.

4. The fixation leg of claim 2, wherein a plurality of partial or complete perforations extend in a line from the first lateral edge to the second lateral edge.

5. The fixation leg of claim 1, wherein a plurality of partial perforations have a variable depth.

6. The fixation leg of claim 1, wherein the body includes a bend that delineates a structural attachment portion at the structural attachment end and an angled transition portion between the structural attachment portion and the substrate attachment end.

7. The fixation leg of claim 6, wherein the impact energy absorption region is located in the angled transition portion.

8. The fixation leg of claim 6, wherein the impact energy absorption region is aligned with a convex curved portion of the bend.

9. The fixation leg of claim 6, further comprising a second bend that delineates a substrate attachment portion at the substrate attachment end such that the angled transition portion is located between the first and second bends and between the substrate attachment end and the structural attachment end.

10. The fixation leg of claim 9, wherein the impact energy absorption region is aligned with a convex curved portion of the second bend.

11. The fixation leg of claim 10, wherein both bends include an impact energy absorption region.

12. The fixation leg of claim 1, wherein the structural component of the vehicle is a crossmember and the interior panel is an instrument panel.

13. A method of manufacturing the fixation leg of claim 1 for an interior panel of a vehicle, comprising the steps of:
directing a laser beam at the body of the fixation leg; and
removing material from the body with the laser beam to form one or more partial or complete perforations at the impact energy absorption region.

14. The method of claim 13, further comprising the step of injection molding the body of the fixation leg before the step of directing the laser beam, wherein the injection molded body has a consistent thickness.

15. The method of claim 14, wherein the injection molding step includes integrally molding the body of the fixation leg with a substrate of the interior panel of the vehicle.

16. The method of claim 13, wherein the material is removed at each of the partial or complete perforations by a discrete laser pulse.

17. The method of claim 16, wherein the material is removed in a plurality of sequential ablation passes.

18. A fixation leg for an interior panel of a vehicle comprising:
a body extending between a substrate attachment end configured to be attached to, or integral with, a substrate of the interior panel and a structural attachment end configured to be attached to, or integral with, a structural component of the vehicle, the body having a first lateral edge and a second lateral edge between the substrate attachment end and the structural attachment end on either side of the body; and
an impact energy absorption region located in the body between the substrate attachment end and the structural attachment end, wherein the impact energy absorption region includes a plurality of complete perforations that extend in a line from the first lateral edge to the second lateral edge, wherein the plurality of complete perforations are located wholly between the first lateral edge and the second lateral edge.

* * * * *